(12) United States Patent
Sumi et al.

(10) Patent No.: US 11,657,782 B2
(45) Date of Patent: *May 23, 2023

(54) DISPLAY APPARATUS

(71) Applicant: InnoLux Corporation, Miao-Li County (TW)

(72) Inventors: Naoki Sumi, Miao-Li County (TW); Keiko Edo, Miao-Li County (TW); Jian-Cheng Chen, Miao-Li County (TW); Toshihiko Araki, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/472,591

(22) Filed: Sep. 11, 2021

(65) Prior Publication Data

US 2021/0407463 A1 Dec. 30, 2021

Related U.S. Application Data

(63) Continuation of application No. 16/136,268, filed on Sep. 20, 2018, now Pat. No. 11,151,964.

(51) Int. Cl.
*G09G 5/14* (2006.01)
*G06F 3/01* (2006.01)
*G09G 5/02* (2006.01)
*G09G 5/10* (2006.01)

(52) U.S. Cl.
CPC .......... *G09G 5/14* (2013.01); *G06F 3/013* (2013.01); *G09G 5/02* (2013.01); *G09G 5/10* (2013.01); *G09G 2320/028* (2013.01); *G09G 2320/0285* (2013.01); *G09G 2320/0626* (2013.01); *G09G 2354/00* (2013.01); *G09G 2360/12* (2013.01); *G09G 2360/144* (2013.01)

(58) Field of Classification Search
None
See application file for complete search history.

(56) References Cited

U.S. PATENT DOCUMENTS

| | | | |
|---|---|---|---|
| 2013/0194259 A1* | 8/2013 | Bennett | G06T 19/006 345/420 |
| 2014/0125659 A1* | 5/2014 | Yoshida | H04N 1/00442 345/589 |
| 2014/0340707 A1* | 11/2014 | Hirabayashi | G01N 21/57 345/589 |
| 2017/0172636 A1* | 6/2017 | Llas Vargas | A61B 17/823 |
| 2018/0114353 A1* | 4/2018 | Champion | G06T 19/006 |
| 2019/0203033 A1* | 7/2019 | Evans | C08L 69/005 |

* cited by examiner

*Primary Examiner* — Andre L Matthews
(74) *Attorney, Agent, or Firm* — Winston Hsu

(57) ABSTRACT

A display apparatus includes a pixel array, an optical modulator, a controller, and at least one memory device storing a frame memory. The optical modulator modulates the light emitted from the pixel array to corresponding angles. The controller generates images of a scene with different lighting profiles corresponding to different viewing angles according to information stored in the frame memory. The frame memory stores color information and material information of objects in the scene. The display apparatus displays the images through the first pixel array at the same time.

16 Claims, 11 Drawing Sheets

FIG. 5

DISPLAY APPARATUS

CROSS REFERENCE TO RELATED APPLICATIONS

This application is a continuation application of U.S. application Ser. No. 16/136,268 filed on Sep. 20, 2018, which is incorporated herein by reference in its entirety.

BACKGROUND OF THE DISCLOSURE

1. Field of the Disclosure

The present disclosure is related to a display apparatus, and more particularly, to a display apparatus capable of displaying images showing different colors and/or light intensities at different viewing angles.

2. Description of the Prior Art

As the display apparatus being adopted in more and more applications, the requirement for better visual effects is also raised. For example, high dynamic range (HDR) displays have been developed to show high contrast images so the details in both the bright portion and the dark portion of an image can be seen. Although the HDR display is able to show images with greater brightness contrast and delivers better visual effects than the traditional display apparatus, the HDR display still has difficulty in showing the real light shining effects.

SUMMARY OF THE DISCLOSURE

One embodiment of the present disclosure discloses a display apparatus including a first pixel array, an optical modulator, a controller and at least one memory device. The optical modulator is disposed on the first pixel array and used to modulate light emitted from the first pixel array to corresponding angles. The controller is used to generate images of a scene with different lighting profiles corresponding to different viewing angles. The at least one memory device stores a frame memory including color information and material information of objects in the scene. The controller generates the images according to the frame memory. The display apparatus displays the images through the first pixel array at a same time.

Another embodiment of the present disclosure discloses a method for operating a display apparatus, the display apparatus comprising a first pixel array, an optical modulator, a controller, and at least one memory device. The method includes storing a frame memory to at least one memory device, the frame memory comprising color information and material information of objects in a scene; the controller generating images of the scene with different lighting profiles corresponding to different viewing angles according to at least information stored in the frame memory; the display apparatus displaying the images through the first pixel array at a same time; and the optical modulator modulating light emitted from the first pixel array to corresponding angles.

These and other objectives of the present disclosure will no doubt become obvious to those of ordinary skill in the art after reading the following detailed description of the embodiment that is illustrated in the various figures and drawings.

BRIEF DESCRIPTION OF THE DRAWINGS

FIG. 5 shows the data structure of the frame memory according to one embodiment of the present disclosure.

DETAILED DESCRIPTION

Figure 1:
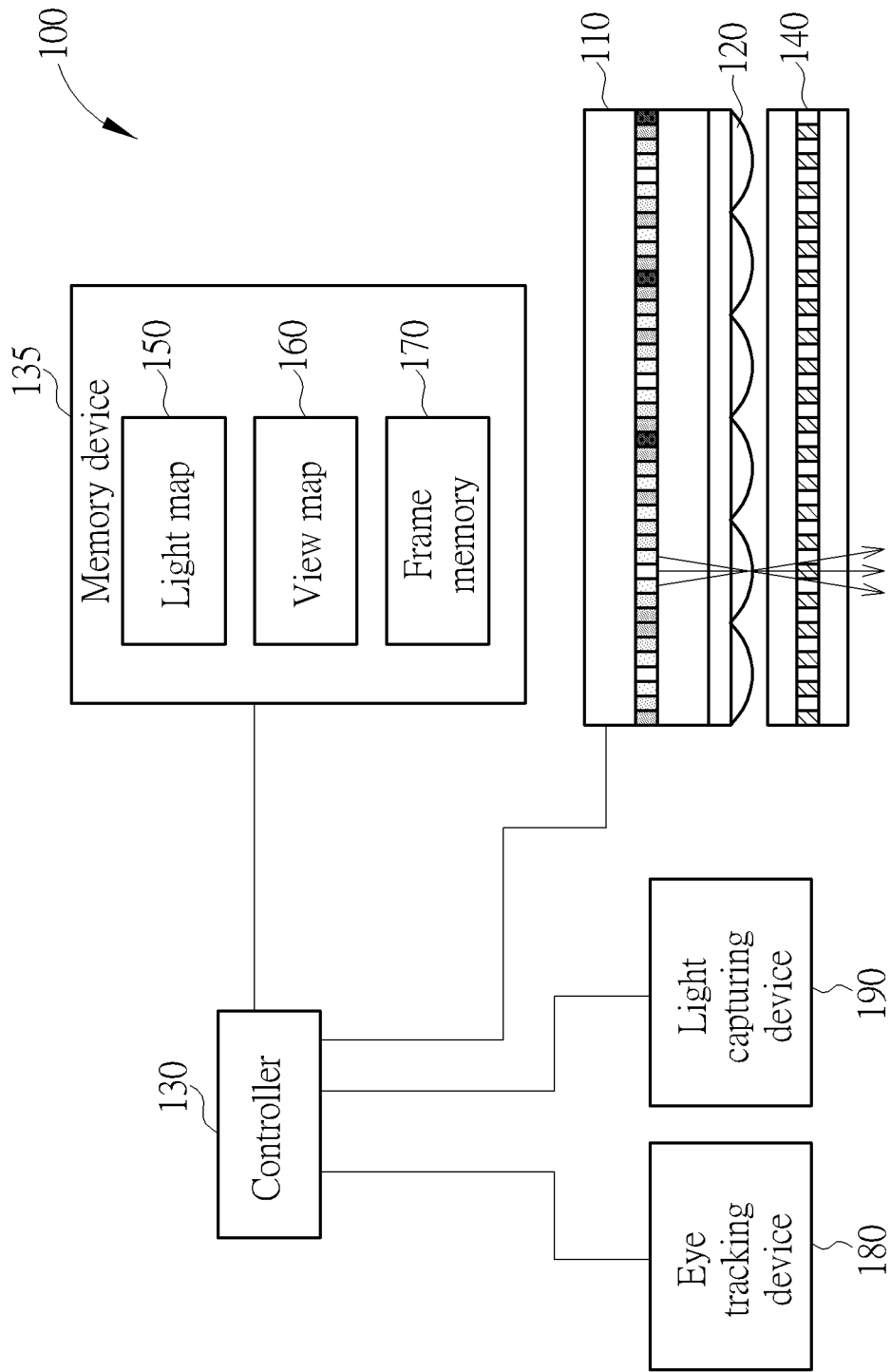
FIG. 1 shows a display apparatus according to one embodiment of the present disclosure.

The terms "about" and "substantially" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "substantially" can mean within one or more standard deviations, or within .+−0.20%, .+−0.15%, .+−0.10%, .+−0.5%, .+−0.3% of the stated value. It is noted that the term "same" may also refer to "about" because of the process deviation or the process fluctuation.

It should be noted that the elements or devices in the drawings of the present disclosure may be present in any form or configuration known to those skilled in the art. In addition, the expression "a layer is disposed above another layer", "a layer is disposed on another layer" and "a layer is disposed over another layer" may indicate that the layer is in direct contact with the other layer, or that the layer is not in direct contact with the other layer, there being one or more intermediate layers disposed between the layer and the other layer.

One advantage of the display apparatus of the present disclosure is showing the real light shining effect in a static scene. To show the real light shining effects, people may see different lighting profiles on the same object when watching the display from different viewing positions. For example, some objects, such as the butterfly wings and the bubbles, can scatter the light and produce structural colors. In this case, people may see different colors and/or light intensities when looking at the object from different positions. However, the conventional display can only show unchanged reflection profile of a static scene corresponding to different viewing angles.

FIG. 1 shows a display apparatus 100 according to one embodiment of the present disclosure. The display apparatus 100 includes a public information display apparatus, an automobile display apparatus, a business exhibition display apparatus, or other suitable display apparatus. The display apparatus 100 includes a first pixel array 110, an optical modulator 120, and a controller 130.

In some embodiments, the first pixel array 110 can generate different grey levels of colors to display images. The first pixel array 110 may include a display medium. For example, the display medium may include a liquid crystal, a light-emitting diode (LED), an organic light-emitting diode (OLED), a mini light-emitting diode, a micro light-emitting diode, a quantum dot, a fluorescence, a phosphor, a display medium of other kinds, or a combination thereof. However, the present disclosure is not limited thereto. In some other embodiments, the first pixel array 110 may use other types of pixel array to display the images according to the system requirement.

In some examples, the optical modulator 120 is disposed on the first pixel array 110, and may be able to modulate the light emitted from the first pixel array 110 to corresponding angles. The optical modulator 120 can be, for example but not limited to, lenticular lens, liquid crystal (LC) grin lens, parallax barrier, LC parallax barrier, or other suitable optical components that can modulate the light.

Figure 2:
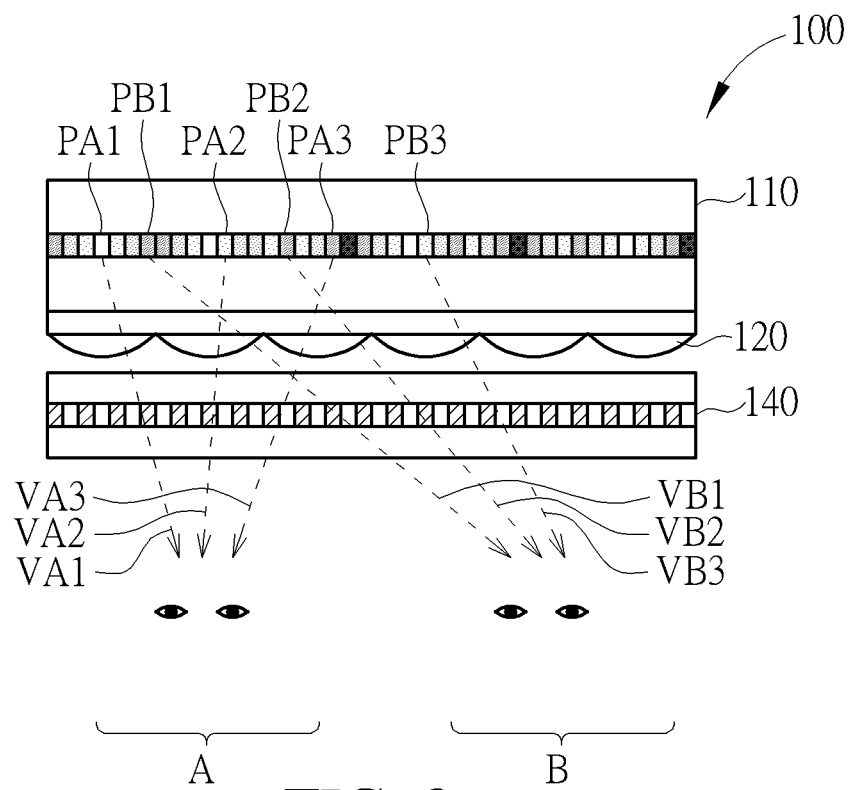
FIG. 2 shows a viewing scenario of the display apparatus in FIG. 1.

With the optical modulator 120, the light emitted by at least a portion of the pixels in the first pixel array 110 can be modulated to different viewing angles. For example, FIG. 2 shows a viewing scenario of the display apparatus 100. In FIG. 2, the light emitted by the pixels PA1, PA2, and PA3 may be modulated to the same viewing region A while the light emitted by the pixels PB1, PB2, and PB3 may be modulated to the same viewing region B. Therefore, when viewing the display apparatus 100, the eyes of the viewer watching the display apparatus 100 at the viewing region A will see the image displayed by the pixels PA1, PA2, and PA3, and the eyes of the viewer watching the display apparatus 100 at the viewing region B will see the image displayed by the pixels PB1, PB2, and PB3.

The controller 130 can generate the images for the same scene with different lighting profiles (e.g. colors and/or light intensities) corresponding to different viewing angles, and the display apparatus 100 will display the images through the first pixel array 110 at the same time. That is, the images generated by the controller 130 can be corresponding to the same scene with the same objects but with different lighting profiles corresponding to different viewing angles, so the viewer will see the same objects with different lighting profiles in different viewing angles, simulating the real shining effects and improving the visual effects.

For example, in reality, the intensity of reflected light received by the viewer is varied with the viewing angles, and the variance of light intensity may have a sharper peak if the object has a smoother surface. That is, if the object is made by metal and has a smoother surface, the reflected light may only be seen from a narrow scope of viewing angles. With the display apparatus 100, the viewer may only see the reflection when he/she enters that scope of viewing angles. Therefore, the realistic lighting effects can be simulated by the display apparatus 100, providing the desired visual effect.

In FIG. 1, the display apparatus 100 may further include a second pixel array 140. In this case, the optical modulator 120 can be disposed between the first pixel array 110 and the second pixel array 140. The second pixel array 140 can further modulate the light passing through the optical modulator 120; therefore, the resolution of the image can be further improved. In some embodiments, some of the layers (e.g. polarizers) of the first pixel array 110 and some of the layers of the second pixel array 140 can be disposed in a crossing manner to reduce the Moiré effect. In some examples, the optical modulator 120 may be disposed in a slanting manner to the first pixel array 110 and/or the second pixel array 140.

In some embodiments, one of the first pixel array 110 and the second pixel array 140 may include a color filter layer. For example, the first pixel array 110 can display the images with single-colored grey levels (e.g. monochrome), and the second pixel array 140 can display the images with multiple-colored grey levels. That is, the first pixel array 110 may be used to control the brightness distribution and the second pixel array 140 may be used to control the color distribution. However, in some other embodiments, the first pixel array 110 may display the images with multiple-colored grey levels, and the second pixel array 140 may display the images in monochrome. Furthermore, the display device 100 may also omit the second pixel array 140 in some other embodiments.

Also, to generate the images with different lighting profiles corresponding to different viewing angles, the display apparatus 100 also needs the information of the object(s) in the scene. Therefore, as shown in FIG. 1, in one embodiment, the display apparatus 100 may also include at least one memory device 135 to store the information of a light map 150, a view map 160, and a frame memory 170. The controller 130 can generate the images according to the information of the light map 150, the view map 160, and the frame memory 170.

The information of the light map 150 may include the intensities and locations of the light in the ambient environment for viewing the scene. In some embodiments, the light map 150 may be an image showing the existence of all surrounding light. In the light map 150, the intensity of the light at each spatial location can be recorded in the corresponding pixel of the image.

In some embodiments, the light map can be designed by the computer graphic (CG) rendering software, and the light map 150 can be generated by the CG rendering software as well. However, in some other embodiments, the display apparatus 100 may further include a light capturing device 190 to generate the information to be stored in the light map 150 of the real viewing environment. For example, the light capturing device 190 can be a fisheye camera and can record the intensities and the locations of the light in the ambient environment for generating the light map. The light map 150 can be stored in a fisheye format, an equi-rectangular format, or a cubical format.

The information of the view map 160 may include the viewing vectors of at least a portion of pixels in the first pixel array 110. In some examples, the viewing vector may include the information of the light path emitted from a pixel through the optical modulator 120. For example, in FIG. 2, the light path may be denoted as a viewing direction, the viewing directions VA1, VA2, VA3 of the pixels PA1, PA2, and PA3 would be recorded in the view map 160. In some embodiments, the viewing directions VA1, VA2, and VA3 can be stored in forms of vectors or in forms of vector IDs. In some embodiments, if the lenticular lens is adopted as the optical modulator 120, the viewing vector may be a 1 dimensional value representing the viewing angles on the same plane as the objects. In this case, the view map 160 can be corresponding to at least a portion of the pixels in the first pixel array 110, and the value of the pixel in the view map 160 would be the 1 dimensional value of the viewing angle. In other examples, the viewing vector may be a 2 dimensional value and may be shown as (x, y). It may depend on the optical modulator used in the display apparatus.

Also, since the viewing vectors of the pixels are related to the modulation caused by the optical modulator 120, the viewing vectors of the pixels may be known factors to the display apparatus 100 when the parameters of the optical modulator 120 are determined, and thus viewing vectors can be preliminarily saved in the memory during manufacturing. However, in some other embodiments, the viewing vectors can also be derived by measurement. In this case, the inaccuracy caused during manufacturing can be calibrated, thereby improving the accuracy.

The information of the frame memory 170 may include the color information, the material information and the position information of the objects in the scene. In examples, the frame memory 170 may include a format of the input video frame. The light map and the view map may be stored in one memory device, while the frame memory may be stored in another memory device. In some examples, other information may be added into the frame memory 170. In one embodiment, to render the images into the scene may require the consideration of at least two different types of light, and the at least two different types of light may be the diffused light and the specular light. The diffused light can be seen as the ambient light and can help to show the intrinsic color of the object. In some examples, the diffused light may not be changed when changing the viewing angles. The specular light may be reflected light corresponding to different viewing angles, and the viewer may see different levels (and different colors) of reflected light according to the viewing angles.

Since the diffused light is rather straight forward for showing the intrinsic color of the objects, it can be seen as the color information of the object and may be stored in the frame memory 170.

Figure 3:
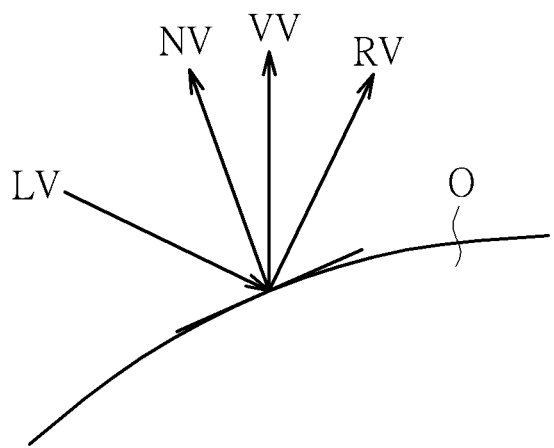
FIG. 3 shows the specular light reflection on an object of the scene displayed by the display apparatus in FIG. 1.

However, deriving the reflection of the specular light may be more complicated. FIG. 3 shows the specular light reflection on an object O of the scene. In FIG. 3, the reflection vector RV can be derived according to the lighting vector LV of the light source and the surface normal vector NV of the object O. In some embodiments, the position information of the objects stored in the frame memory 170 can include the surface normal vector NV of the object O. Also, the lighting vector LV can be generated according to the information stored in the light map. Therefore, with the locations of the light stored in the light map 150 and the surface normal vectors stored in the frame memory 170, the controller 130 would be able to derive the reflection vectors of specular light.

Since the intensities of the reflection can be seen by the viewer are also related to the viewing vector VV and the material of the object O as aforementioned, the controller 130 will further derive intensities of the specular light according to the viewing vectors stored in the view map 150, the material information of the objects stored in the frame memory 170, and the reflection vectors of the specular light derived previously.

Figure 4:
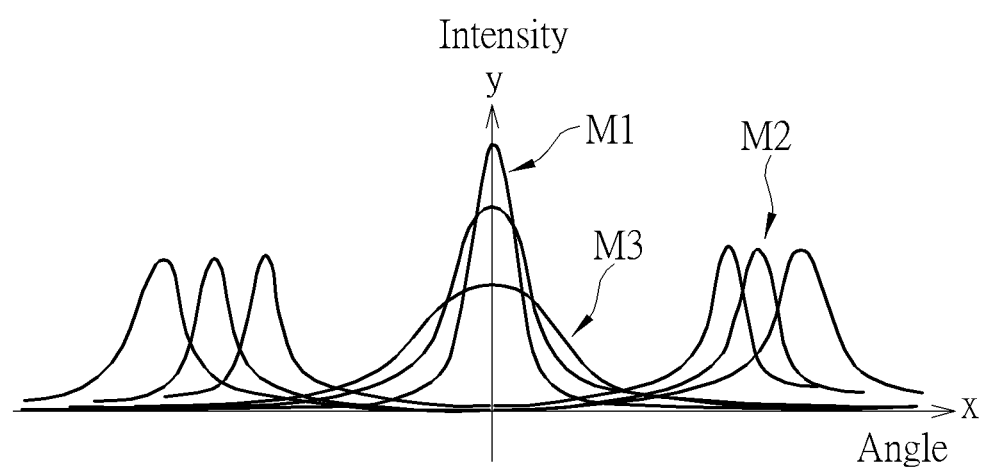
FIG. 4 shows the specular light reflection profile corresponding to different materials.
Figure 6A:
FIGS. 6A-6E shows the images of a static scene of the display apparatus of FIG. 1 from five viewing angles according to one embodiment of the present disclosure.
Figure 6B:
Figure 6C:
Figure 6D:
Figure 6E:
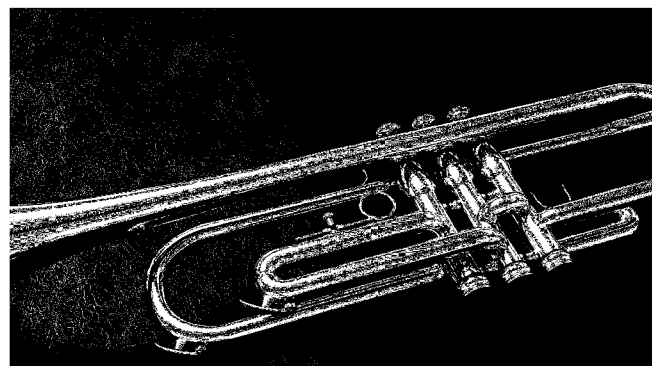

FIG. 4 shows the specular light reflection profile corresponding to different materials. In FIG. 4, Y axis represents the intensity of the object O while X axis represents the angle between the reflection vector (e.g. the reflection vector RV) and the viewing vector (e.g. the viewing vector VV).

In FIG. 4, the material M1 may have a smooth surface. For example, the material M1 may be a polished metal. Therefore, the intensity of the reflected light on the surface of the material M1 may be greater when the angle between the viewing vectors and the reflection vector is rather small, and the intensity distributions are centralized.

However, in FIG. 4, the material M2 may have a surface capable of generating the structural light. For example, the material M2 may be the compact disk (CD), or the butterfly wings. In this case, the intensities of the red reflected light, the green reflected light, and the blue reflected light on the surface of the material M2 may have different distributions, and, thus, the viewer may see different colors when watching the display apparatus 100 from different position. The material M3 may be different from the materials M1 and M2. Therefore, the reflection profile is different from the reflection profiles of the materials M1 and M2.

Since the calculation for the lighting profile for different materials can be complicated, the display apparatus 100 can store the reflection profiles for different materials in a lookup table in advance in some embodiments. Therefore, the reflection intensity can be derived with the lookup table by inputting the material type, and the angle between the viewing vector and the reflection vector. In some examples, the angle may be a function of the light map, the view map, and the position information.

In this case, the material information can be stored as the material ID. That is, different types of materials can correspond to different IDs. With the material ID and the angle between the reflection vector and the viewing vector, the corresponding reflection profile can be retrieved from the lookup table.

Consequently, the controller 130 would be able to generate the images of the scene by combining the diffused light effect and the specular light effect according to the color information of the objects and the intensities of the specular light.

Since the display apparatus 100 can use the lookup table to retrieve the required reflected lighting profile, the complicated computation can be reduced, thereby allowing the display apparatus 100 to generate the images of the scene for real time video.

Figure 5:
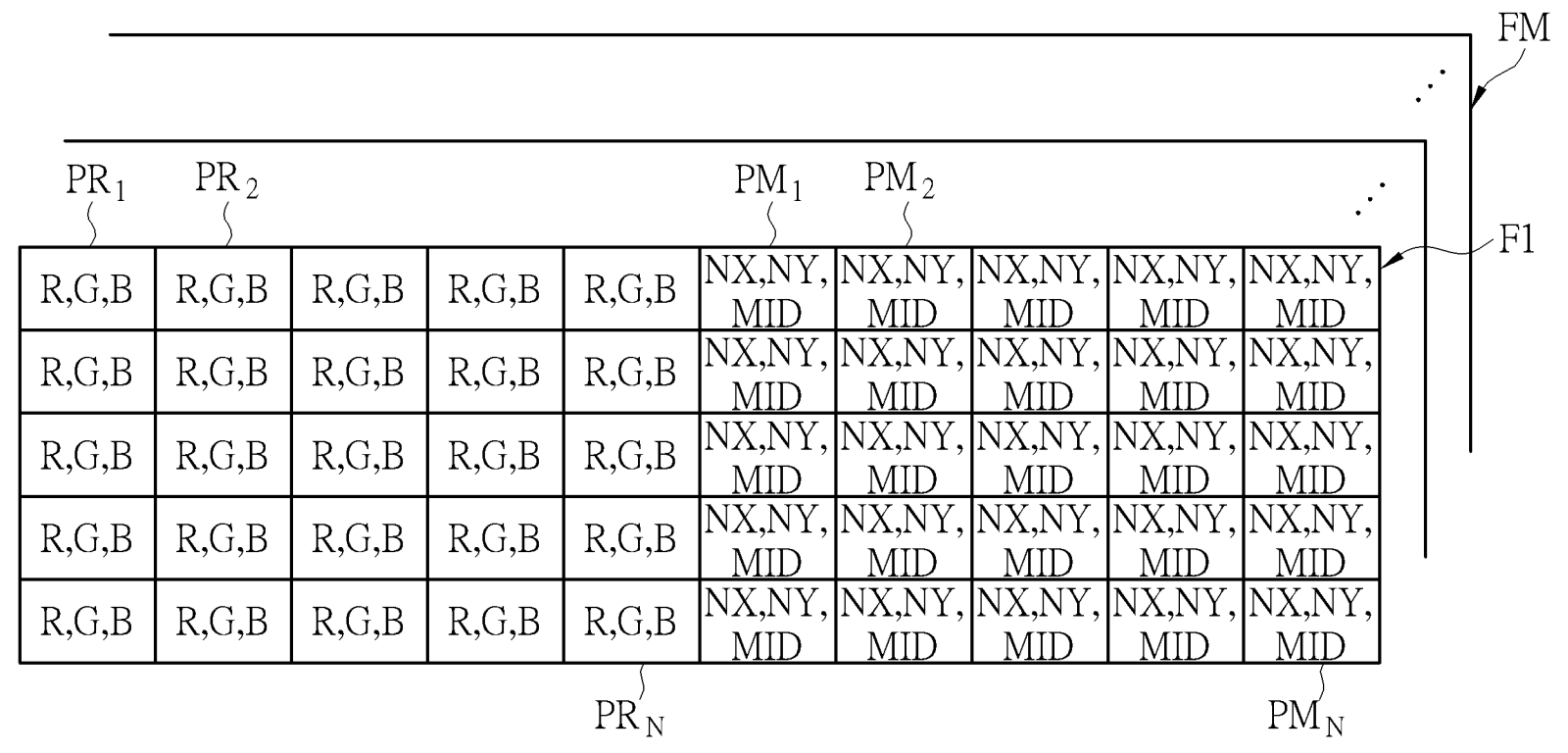

FIG. 5 shows the data structure of the frame memory 170 according to one embodiment of the present disclosure. In FIG. 5, the information stored in the frame memory 170 can be stored by multiple frames F1 to FM (M is a positive integer greater than 1), each frame corresponding to an image. In this case, the color information of the objects in frame F1 can be stored with a plurality of pixels $PR_1$ to $PR_N$ and a plurality of pixels $PM_1$ to $PM_N$, wherein N is a positive integer greater than 1. At least one of the pixels $PR_1$ to $PR_N$ includes the intensity of the red sub-pixel (R), the green sub-pixel (G), and the blue sub-pixel (B). Also, the position information and the material information of the objects can also be stored by the format of pixels $PM_1$ to $PM_N$ in the same frame. In FIG. 5, one of the pixel $PM_1$ to $PM_N$ is corresponding to a pixel of the pixels $PR_1$ to $PR_N$, and includes the two dimensional normal vector (NX, NY) and the material ID MID. That is, in FIG. 5, at least one of the frames may be divided into at least two parts: one for the color information R, G, and B while another one for the normal vectors NX and NY and the material ID MID. However, the present disclosure is not limited by the storing order shown in FIG. 5. In some other embodiments, pixels $PR_1$ to $PR_N$ and pixels $PM_1$ to $PM_N$ can be stored in a different order, such as interleaving lines, according to the system requirement.

Although the reflection profile shown in FIG. 4 is corresponding to one dimensional angle (along X axis), in some other embodiments, the lookup table can include at least two dimensional table for two dimensional angles. In this case, the anisotropic reflection effect produced by the objects such as the cat eye stone can also be presented by the display apparatus 100.

Furthermore, although the frame memory 170 may store the material IDs and the surface normal vectors for deriving the reflected lighting profile, in some other embodiments, the frame memory 170 may store other types of information for deriving the reflected lighting profile according to the system requirement.

For example, in some other embodiments, the position information of the objects stored in the frame memory 170 can include the depth information of the objects, and the material information of the objects stored in the frame memory 170 can include the refractive indices and coarse parameters of the objects. In this case, the controller 130 may generate the images of the scene by calculation according to the information stored in the light map 150, the view map 160, and the frame memory 170. Therefore, the lookup table may be omitted.

In addition, in some embodiments, the display apparatus 100 may generate multi-layered frame data for the object to simulate the transparency and interface reflection effects, thereby making the images of the scene look even more realistic.

Furthermore, in FIG. 1, the display apparatus 100 can further include an eye tracking device 180. The eye tracking device 180 can track the position of the viewer. In this case, the controller 130 can generate the images according to the information stored in the light map, the view map, and the frame memory, and the position of the viewer. Since the position of the viewer can be detected, the display apparatus 100 can dedicatedly generate the images of the scene corresponding to the viewing directions that are within a region near to the position of the viewer.

In this case, the display apparatus 100 can provide adaptive viewing angles according to the tracked position of the viewer. Therefore, the range of the viewing angles can be wider, and the jumping issue (or the discontinuous images) caused by the fixed viewing angles may be decreased. Also, since the controller 130 may generate fewer images corresponding to the viewing angles within the position of the viewer, unnecessary computation for images outside of the region may be skipped, thereby saving the power consumption and the calculation resource.

FIGS. 6A-6E shows the images of a static scene of the display apparatus 100 from five viewing angles according to one embodiment of the present disclosure. In other word, when the display apparatus 100 shows a static scene, the viewer may see images with different colors and/or light intensities at different viewing angles. For example, when the viewer changes the viewing angle, the viewer may sequentially see FIGS. 6A to 6E.

Figure 7:
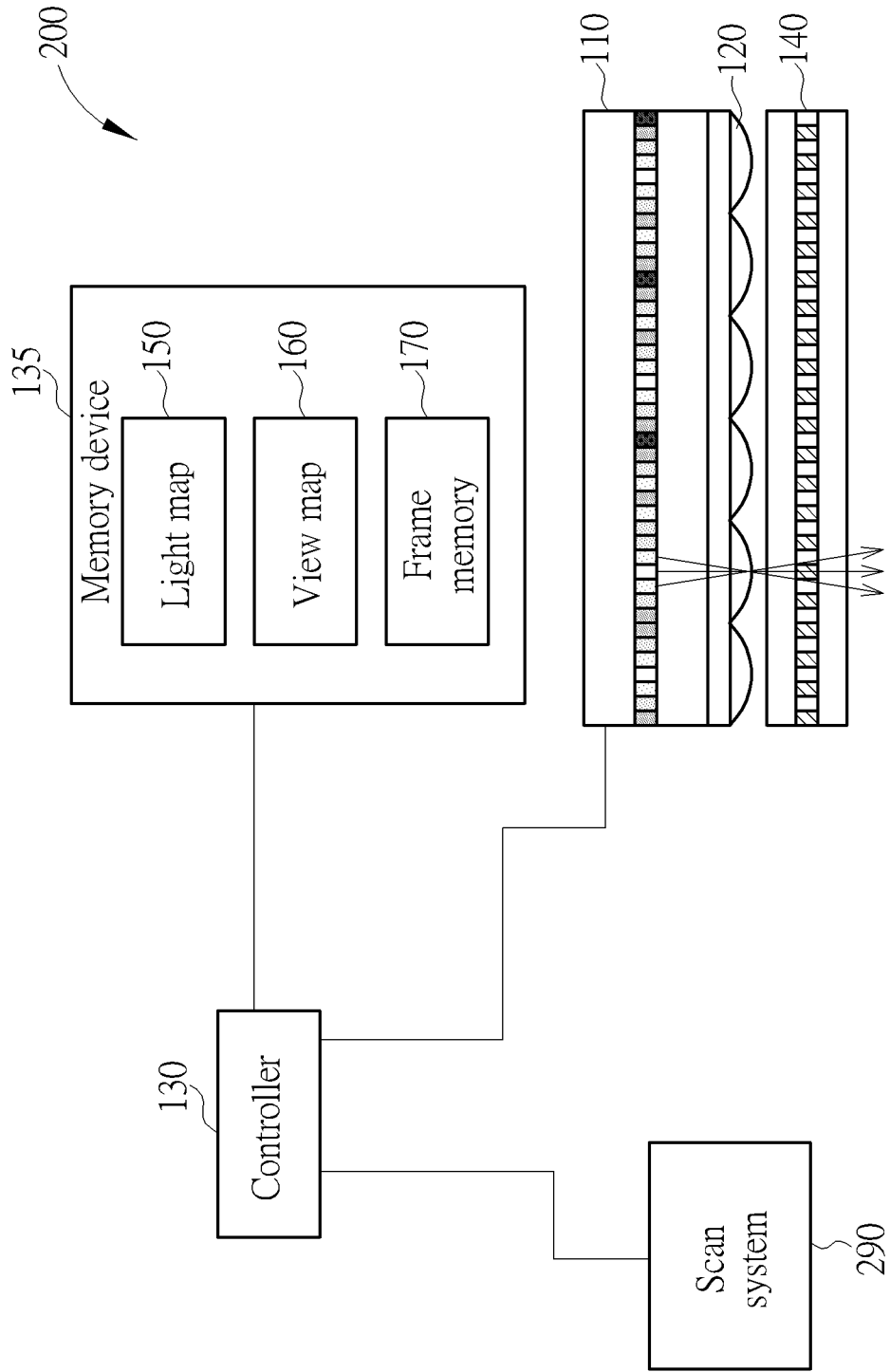
FIG. 7 shows a display apparatus according to another embodiment of the present disclosure.

FIG. 7 shows a display apparatus 200 according to another embodiment of the present disclosure. The display apparatus 200 has a similar structure as the display apparatus 100, and can be operated with similar principles as the display apparatus 100. However, the display apparatus 200 further includes a scan system 290 for generating the information stored in the light map 150 and/or the frame memory 170 in a real scene.

Figure 8:
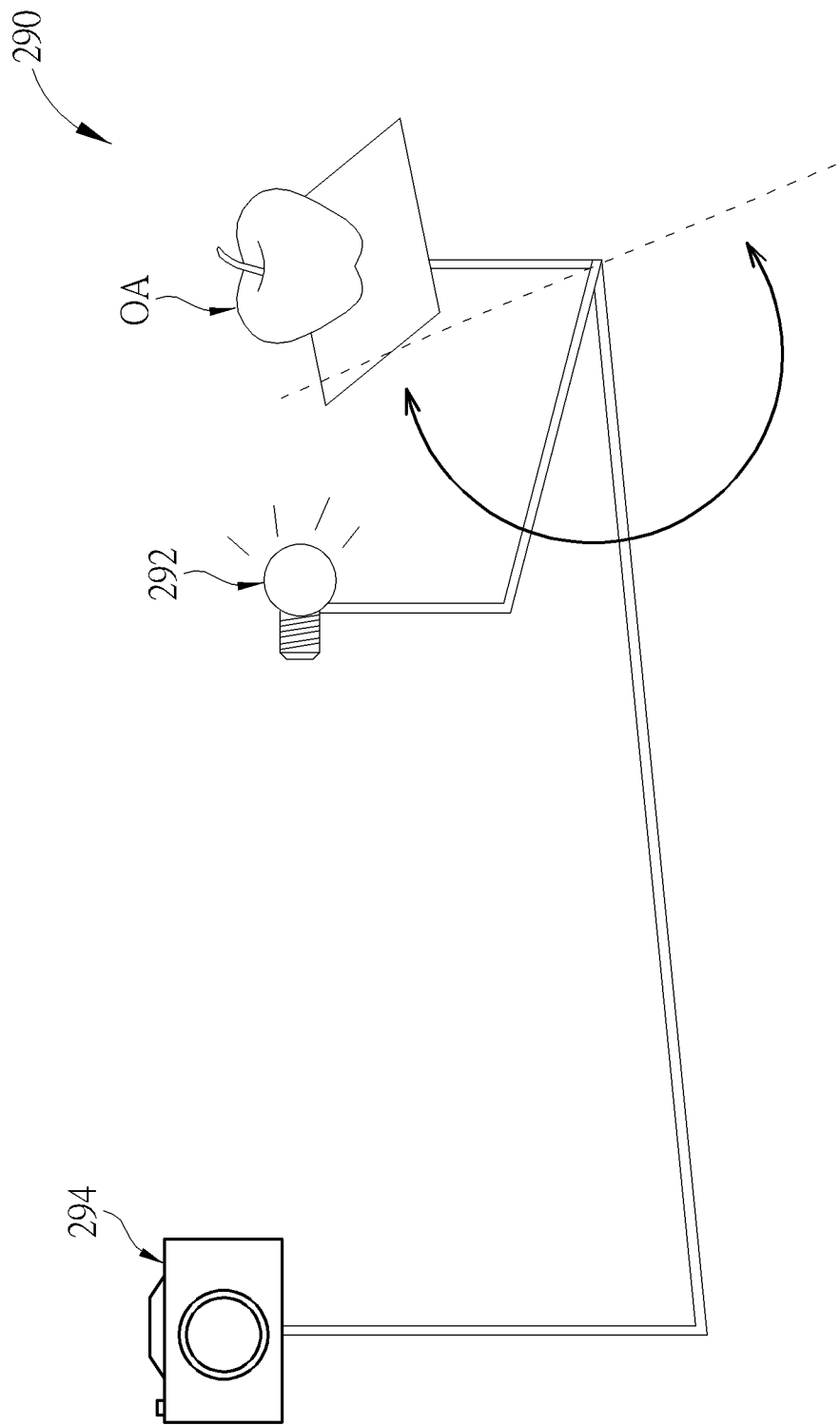
FIG. 8 shows the usage scenario of the scan system of FIG. 7.

The scan system 290 can include a light source 292 and a light capturing device 294 (e.g. a camera). FIG. 8 shows the usage scenario of the scan system 290. In FIG. 8, the light source 292 can revolve around the object OA to cast light on the object OA from different angles while the distance between the light source 292 and the object OA may remain constant. In some examples, the distance between the light source 292 and the object OA may be varied. In some embodiments, the light source 292 can be implemented by a spot light, a light bar or other different types of light sources. The light capturing device 294 can capture the images of the object OA in the scene with the light being casted from different locations. In some embodiments, the light source 292 can be disposed above or below the object OA so that the light source 292 may not appear in the images captured by the light capturing device 294. In other examples, the light source 292 can be disposed in the same level as the object OA.

In some embodiments, the light source 292 may revolve around the object OA for a total of 180 degrees and shifting 1 degree at a time. In this case, the light capturing device 294 will capture an image whenever the light source 292 moves to the next position so a total of 180 different lighting profiles of the object OA can be derived. However, in some embodiments, the total revolving degree may be in a range from 30 degrees to 360 degrees, such as 60 degrees, 120 degrees, 150 degrees, or 270 degrees. The degree of one revolving step may be in a range from 0.1 degrees to 60 degrees. But the present disclosure is not limited thereto. Also, in one example, the total revolving degree and the degree of one revolving step can be determined according to the pitch of the optical modulator 120.

Consequently, the scan system 290 can generate the information to be stored in the light map and/or frame memory 170 according to the images captured by the light capturing device 294 and/or the locations of the light source 292.

Figure 9:
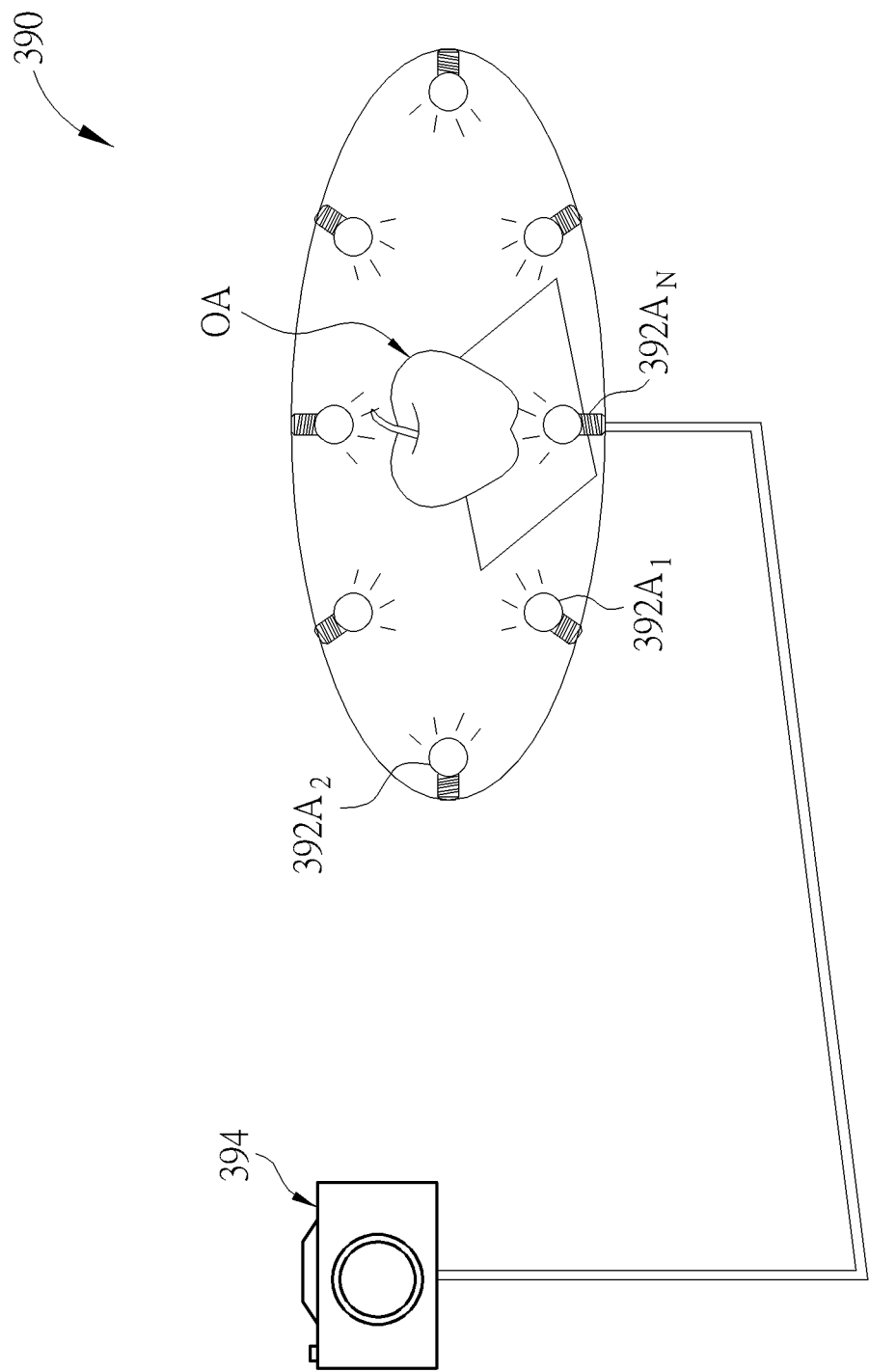
FIG. 9 shows a scan system according to another embodiment of the present disclosure.

In some embodiments, the scan system 290 can further include more light sources. FIG. 9 shows a scan system 390 according to another embodiment of the present disclosure. The scan system 390 includes light sources $392A_1$ to $392A_N$, and N is a positive integer greater than 1. The light sources $392A_1$ to $392A_N$ disposed on the circumference of the circle with the object OA being at the center of the circle. Also, the central angles between two adjacent light sources of the light sources $392A_1$ to $392A_N$ may be substantially equal. In some embodiments, the light sources $392A_1$ to $392A_N$ are disposed above or below the object OA so that the light sources $392A_1$ to $392A_N$ will not appear in the images captured by the light capturing device 394. In other examples, the light sources $392A_1$ to $392A_N$ may be disposed in the same level as the object OA.

In one embodiment, the light sources $392A_1$ to $392A_N$ can revolve around the object OA within a predetermined range. For example, the light sources $392A_1$ may move from the current position to the position next to the light source $392A_2$ in FIG. 9, and for example but not limited to, 1 degree at a time. Also, the light sources $392A_1$ to $392A_N$ can move and cast light sequentially, so the light capturing device 394 can capture the image of the object OA with different lighting profiles one at a time.

In FIG. 8 and FIG. 9, the light sources can revolve around the object OA; however, in some other embodiments, the light sources can also be fixed at the same positions. For example, in some embodiments, if the number N of the light sources $392A_1$ to $392A_N$ is large enough, the light sources $392A_1$ to $392A_N$ may be fixed on the circumference of the circle with the object OA being at the center of the circle, and the light sources $392A_1$ to $392A_N$ can cast the light on the object OA from the different locations sequentially.

Alternatively, in FIG. 8, if the light source 292 is fixed at the same position, the light capturing device 294 may revolve around the object OA as the object OA spins synchronously. Therefore, the light capturing device 292 will capture the images of the same side of the object OA with different lighting profiles, and the images can be used to generate the information required by the display apparatus 100.

Figure 10:
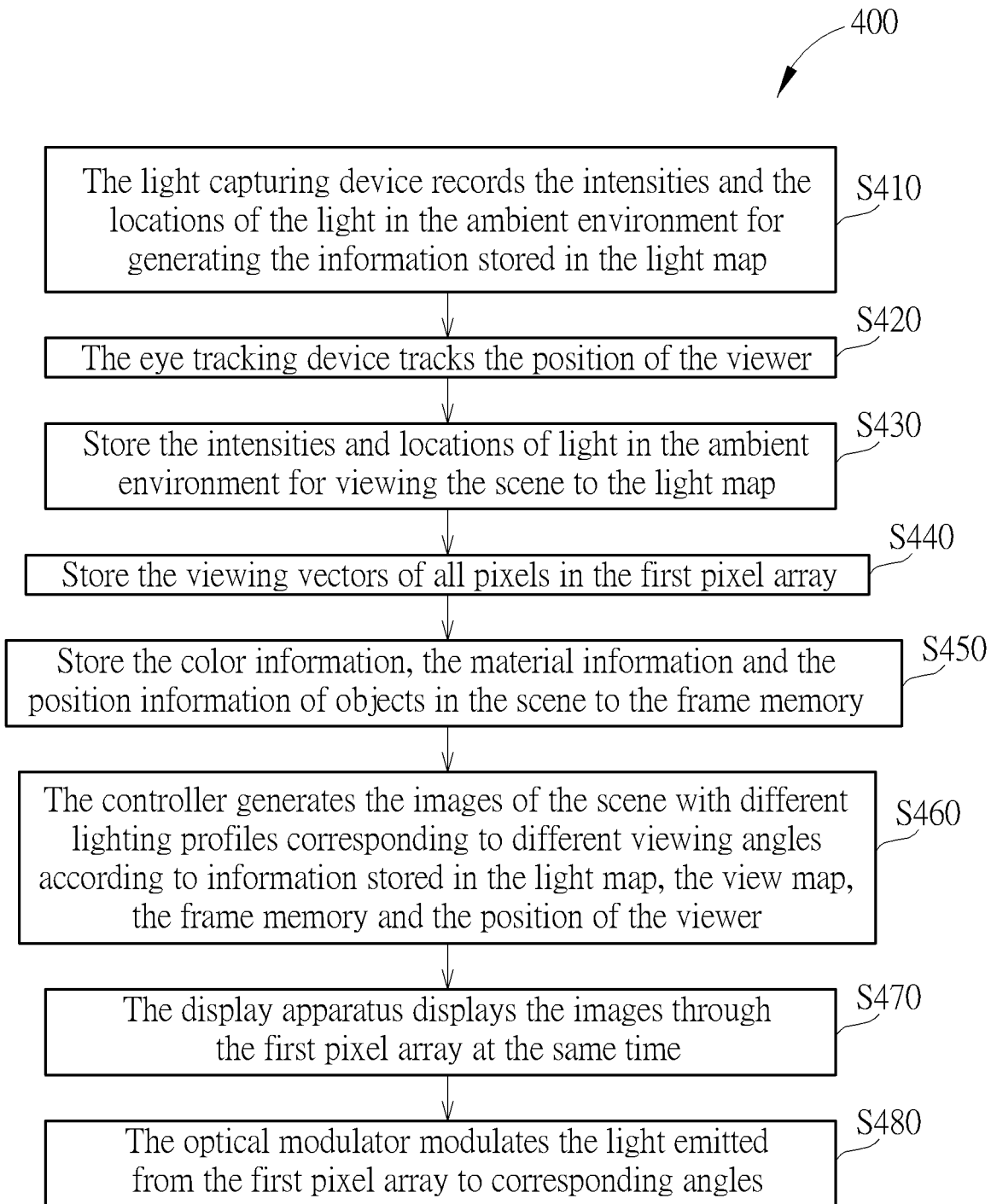
FIG. 10 shows a flow chart of a method for operating the display apparatus of FIG. 1 in accordance with one embodiment of the present disclosure.

FIG. 10 shows a flow chart of a method 400 for operating the display apparatus 100 in accordance with one embodiment of the present disclosure. The method 400 includes steps S410 to S480. Some of the steps may be omitted as another embodiment of the present disclosure. In one example, the step S420 may be omitted. In one embodiment, the sequence of the steps S410 to S480 may be changed or integrated as one step. In one example, the step S430 may be performed before the step S410. In other examples, the step S420 may be performed after the step S450 or the step S480. In some examples, the steps S430, S440 and/or S450 may be integrated as one step. But the present disclosure is not limited thereto.

S410: the light capturing device 190 records the intensities and the locations of the light in the ambient environment for generating the information that would be subsequently stored in the light map 150 and/or the frame memory 170;

S420: the eye tracking device 180 tracks the position of the viewer;

S430: store the intensities and locations of light in the ambient environment for viewing the scene as the light map 150 in at least one memory device 135;

S440: store the viewing vectors of the pixels in the first pixel array 110 in at least one memory device 135;

S450: store the color information, the material information and the position information of objects in the scene as the frame memory 170 in at least one memory device 135;

S460: the controller 130 generates the images of the scene with different lighting profiles corresponding to different viewing angles according to information stored in the light map 150, the view map 160, the frame memory 170 and the position of the viewer;

S470: the display apparatus 100 displays the images through the first pixel array 110 at the same time;

S480: the optical modulator 120 modulates the light emitted from the first pixel array 110 to corresponding angles.

In step S410, the light capturing device 190 can record the intensities and the locations of the light in the ambient environment for generating the information that would be stored in the light map 150 and/or the frame memory 170. However, in some embodiments, the intensities and locations of light in the ambient environment that stored in the light map 150 may be generated by the computer graphic rendering software. In some examples, the light capturing device 190 may be omitted, and step S410 can be skipped.

In addition, the display apparatus 100 can generate the images corresponding to the position of the viewer based on the tracking result of the eye tracking device 180 in step S420. However, in some embodiments, the display apparatus 100 may also omit the eye tracking device 180. In this case, the controller 130 may generate the images corresponding to any possible viewing angles supported by the display apparatus 100 according to the information stored in the light map 150, the view map 160, and the frame memory 170, without considering the position of the viewer. That is, step S420 may be skipped.

In some embodiments, the position information of the objects in the scene stored in the frame memory 170 can include the surface normal vectors of the objects. In this case, in the step S460, the controller 130 may derive the reflection vectors of specular light according to the surface normal vectors stored in the frame memory 170 and the locations of the light stored in the light map 150 at first. Then, the controller 130 may derive the intensities of the specular light according to the reflection vectors of the specular light, the viewing vectors stored in the view map 160, and the material information of the objects stored in the frame memory 170 with a lookup table. Finally, the controller 130 can generate the images to show the color information of the objects and the intensities of the specular light by combining the lighting effects caused by the diffused light and the specular light.

With the lookup table storing the reflected lighting profiles of different materials, the method 400 can save significant computation overhead and allow the display apparatus 100 to generate the images soon enough to present a real time video, providing even more astonishing visual effects.

However, in some other embodiments, the position information of the objects stored in the frame memory 170 may include the depth information of the objects, and the material information of the objects stored in the frame memory 170 may include the refractive indices and coarse parameters of the objects. In this case, the controller 130 may generate the images of the scene by calculation according to the information stored in the light map 150, the view map 160, and the frame memory 170. Therefore, the lookup table may be omitted.

Furthermore, the method 400 is not limited by the order shown in FIG. 10. For example, in some embodiments, steps S410 and S420 may be performed in parallel, and steps S430 to S450 may be performed in parallel.

Figure 11:
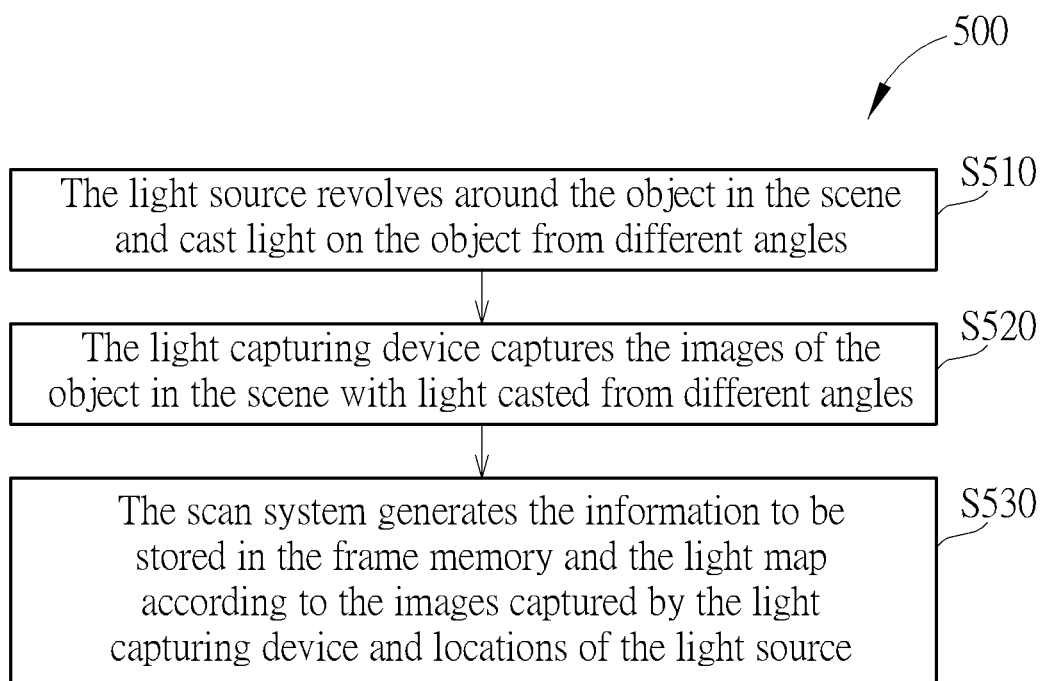
FIG. 11 shows a flow chart of a method 500 for operating the display apparatus of FIG. 7 in accordance with one embodiment of the present disclosure.

FIG. 11 shows a flow chart of a method 500 for operating the display apparatus 200. The method 500 includes steps S510 to S530.

S510: the light source 292 revolves around the object OA in the scene and cast light on the object OA from different angles;

S520: the light capturing device 294 captures the images of the object OA in the scene with light casted from different angles; and S530: the scan system 290 generates the information to be stored in the light map 150 and/or the frame memory 170 according to the images captured by the light capturing device 294.

With the method 500, the scan system 290 would be able to generate the information to be stored in the light map 150 and/or the frame memory 170 so the display apparatus 100 can generate the images accordingly. In some embodiments, if the light source 292 is fixed at the same spot, then, instead of performing step S510, the light capturing device 294 may revolve around the object OA as the object OA spins synchronously to capture the images with the light from different angles.

Also, in some embodiments, for example, in the scan system 390, a plurality of light sources $392A_1$ to $392A_N$ can be disposed on the circumference of the circle with the object being at the center of the circle. In this case, the method 500 can also be applied and the light sources $392A_1$ to $392A_N$ can revolve around the object OA within a predetermined angle to cast light on the object OA from different angles in step S510. Also, the light sources $392A_1$ to $392A_N$ can move and cast light sequentially, so the light capturing device 394 can capture the image of the object OA with different lighting profiles. However, in some other embodiments, the light sources $392A_1$ to $392A_N$ can be disposed in a fixed spot and cast the light on the object OA from different angles sequentially.

By moving the light sources 292, and $392A_1$ to $392A_N$ or moving the light capturing devices 294 and 394, the different lighting profiles on the object OA can be captured, and the scan systems 290 and 390 can generate the information to be stored in the light map 150 and/or the frame memory 170 accordingly.

In summary, the display apparatus and the method for operating the display apparatus provided by the embodiments of the present disclosure can generate images for the same scene (e.g. astatic scene) with different lighting profiles corresponding to different viewing angles, so the viewer can see different lighting results (e.g. different light intensities and/or colors) of the scene when viewing the display apparatus from different angles. Therefore the display apparatus can simulate the light shining effect in reality and provides a better visual experience to the viewers. In addition, with the scan systems provided by the embodiments of the present disclosure, the information required by generating images of different viewing angles can be derived, allowing the display apparatus to be applied in even more fields.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display apparatus comprising:
a pixel array;
an optical modulator disposed on the pixel array and configured to modulate light emitted from the pixel array to corresponding angles;
a memory device storing information of a frame memory, information of a light map, and information of a view map, wherein the information of the frame memory comprises color information, material information of objects in the scene, and position information of the objects in the scene, the position information comprises surface normal vectors of the objects, and the information of the light map comprises intensities and locations of light in an ambient environment for viewing the scene; and
a controller configured to generate images of a scene with different lighting profiles corresponding to different viewing angles, wherein the controller generates the images according to the information of the frame memory and the information of the light map, and the images are displayed in the display apparatus through the pixel array at a same time;
wherein the pixel array comprises a plurality of pixels, and the information of the view map comprises viewing vectors of at least a portion of the pixels.

2. The display apparatus of claim 1, wherein the controller derives intensities of specular light according to the surface normal vectors stored in the information of the frame memory, the locations of the light stored in the information of the light map, and the viewing vectors stored in the information of the view map.

3. The display apparatus of claim 2, wherein the controller derives intensities of specular light according to the material information of the objects stored in the information of the frame memory.

4. The display apparatus of claim 1, wherein the position information further comprises depth information of the objects.

5. The display apparatus of claim 1, further comprising a light capturing device for generating the information of the light map.

6. The display apparatus of claim 1, wherein the material information of the objects comprises refractive indices and coarse parameters of the objects.

7. The display apparatus of claim 1, wherein the pixel array further comprises a color filter layer.

8. The display apparatus of claim 1, further comprising an eye tracking device configured to track a position of a viewer, wherein the controller generates the images according to the position of the viewer.

9. The display apparatus of claim 1, wherein the controller generates the images by using a Bidirectional Reflectance Distribution Function (BRDF) algorithm.

10. The display apparatus of claim 1, further comprising a scan system comprising:
at least one light source configured to revolve around an object in the scene and cast light on the object from different angles; and
a light capturing device configured to capture images of the object in the scene with light being casted from different angles.

11. The display apparatus of claim 10, wherein the scan system is configured to generate information to be stored in the frame memory according to the images captured by the light capturing device.

12. The display apparatus of claim 1, further comprising a scan system comprising:
a plurality of light sources disposed at different locations and configured to cast light on an object in the scene from different angles; and
a light capturing device configured to capture images of the object in the scene with light from different angles.

13. The display apparatus of claim 12, wherein the plurality of light sources are disposed on a circumference of a circle with the object being at a center of the circle.

14. The display apparatus of claim 13, wherein the scan system is configured to generate information to be stored in the light map and the frame memory according to the images captured by the light capturing device.

15. The display apparatus of claim 12, wherein the plurality of light sources are configured to revolve around the object in the scene and cast light on the object from different angles.

16. The display apparatus of claim 1, wherein the pixel array further comprises a display medium.

* * * * *